Patented Aug. 2, 1927.

1,637,439

UNITED STATES PATENT OFFICE.

WILLIAM WEBER COBLENTZ, OF WASHINGTON, DISTRICT OF COLUMBIA, ASSIGNOR TO SECRETARY OF COMMERCE OF THE UNITED STATES, AS TRUSTEE FOR THE GOVERNMENT OF THE UNITED STATES AND THE PEOPLE OF THE UNITED STATES.

EYE-PROTECTIVE GLASS.

No Drawing.   Application filed June 10, 1926.   Serial No. 115,110.

(GRANTED UNDER THE ACT OF MARCH 3, 1883; 22 STAT. L. 625.)

The invention described hereafter may be used by the Government of the United States or any of its officers and employees in prosecution of work for the Government or by any other persons in the United States without the payment to me of any royalty thereon.

This invention relates to a composition of matter and a glass formed therefrom embodying the use of certain minerals and having certain definite characteristics making it especially suitable for protective glasses in excluding harmful light or heat rays while permitting the transmission of other portions of the spectrum, and providing in the case of certain optical glasses ample vision; also for other purposes where it is desirable to exclude the ultra violet and certain other rays while permitting the passage of still others.

The objects of my invention are, among others:

First, to provide a glass that when used in spectacles or eye protectors will prevent injury to the eye from ultra-violet rays;

Second, to provide a glass that will permit clear vision;

Third, to provide a glass that will be blue in color, and particularly of a cobalt blue hue;

Fourth, to provide a single glass that will absorb the ultra-violet rays while still retaining the blue color of cobalt. (Where I have used the terms "single glass" I mean an integral glass; that is to say, one that contains all the constituents in "one melt");

Fifth, to provide a glass which may become or establish a standard of color and ultra-violet absorption, especially for furnace operators;

Sixth, to simplify the construction of optical glasses and other scientific instruments and commercial articles such as containers, etc.;

Seventh, to cheapen the construction of such objects.

Colored glasses have been used for years to protect the eye when looking at bright lights or into furnaces, but these glasses have not given the proper protection; or if protection has been given, then they have not heretofore possessed other desirable characteristics, such as proper and preferred color, ample visibility, &c.

Although such glasses do reduce the intensity of the transmitted light, they do not absorb or "cut out" the harmful ultra-violet rays. Where glasses have been used which have absorbed such rays, they have failed to give sufficient vision in other respects or permit the passage of other portions of the spectrum to the desired degree. Moreover, in certain industries a glass of blue color preferably of cobalt origin is desired, and heretofore regardless of the fact that such glass by itself gives only partial, if any, protection against the harmful ultra-violet rays, the workers in such industries have persisted in using such glasses maintaining that they can observe furnace conditions better through a blue rather than through other colored glasses which do give the protection.

This prejudice is probably in part due to their greater experience with a blue glass. In any event, although absorption glasses have been used which, to a degree, eliminate the harmful rays, they have not had the desired color of cobalt blue, and, in so far as I am aware, no single glass has heretofore been made which combines the necessary constituents so as to give the desired combined characteristics of a cobalt blue color, sufficient clarity of vision of objects observed therethrough, and adequate ultra-violet ray absorption.

I have found that glass containing cerium oxide transmits practically all of the visible spectrum and absorbs the harmful ultra-violet rays.

If cobalt oxide which produces the desired blue color and permits sufficient vision, together with other advantages, is combined in the same melt—that is to say, introduced into the same glass—with cerium oxide, the resultant glass will exhibit the characteristics of each of the said ingredients and combine the advantages of both; and so the desire of furnace operators and other users will be gratified, and at the same time the requirements of safety engineers for a non-actinic glass, will be met.

By my invention I have succeeded in accomplishing this result. I have found that by using the following constituents and preferred proportions I have obtained a composition of matter producing a glass in one melt having the desired cobalt blue color, the wished for visible spectrum transmission quality, ample visibility and the necessary absorption of harmful ultra-violet rays:

|  | Per cent. |
|---|---|
| $SiO_2$ | 69.5 |
| CaO | 6.0 |
| CeO | 6.8 |
| CoO | 0.1 |
| $Na_2O$ | 17.6 |
|  | 100.00 |

The glass melted and fined readily at 1425° C., and worked easily. The apparent color of the glass was so similar to the simple cobalt glass that it was practically impossible to differentiate between them by visual inspection.

While I prefer cerium as an ultra-violet ray absorption agent, I have found that lead oxide, uranium oxide and certain other oxides will to a certain degree also absorb the ultra-violet rays, and I believe that my invention is broad enough to cover the use of such substances in place of cerium oxide. Moreover, I do not wish to be limited to the exact proportion or the exact ingredients set forth above, which is my typical and preferred combination, as certain of these ingredients may be omitted or replaced by others of similar nature and the proportions within limits may be varied. In other words, while I have found that the ingredients and proportions above mentioned give the desired results, and I prefer them, I do not wish to be limited to the use of all of these ingredients, to these exact ingredients and no others, nor the exact proportions set forth above, as the omission of some elements of the admixture or presence of small quantities of other ingredients or a slight variation of proportions will not adversely affect the final product, although it may vary somewhat the relative characteristics of the products resulting from such variations.

What I claim is:

1. A new composition of matter comprising:

|  | Per cent. |
|---|---|
| $SiO_2$ | 60 to 80 |
| CaO | 0.0 to 12 |
| CeO | 5 to 10 |
| CoO | 0.1 to .5 |
| $NaO_2$ | 12 to 25 |

2. As a new article of manufacture a glass containing the usual glass-making constituents and sufficient cobalt oxide to give a blue color equivalent to blue 20+8 on the Lovi-bond scale, and sufficient cerium oxide to stop the ultra-violet rays.

3. As a new article of manufacture a glass containing the usual glass-making constituents and sufficient cobalt oxide to give a blue color equivalent to blue 20+8 on the Lovibond scale, sufficient cerium oxide to stop the ultra-violet rays and to absorb the majority of the infra-red rays.

4. As a new article of manufacture a glass containing the usual glass-making constituents and sufficient cobalt oxide to give a blue color equivalent to blue 20+8 on the Lovibond scale, sufficient cerium oxide to stop the ultra-violet rays and to absorb the majority of the infra-red rays while permitting the transmission of approximately 1½ per cent of visible light.

WILLIAM WEBER COBLENTZ.